United States Patent [19]

Parks

[11] 4,031,777
[45] June 28, 1977

[54] LOW STRESS CAM ROLLER

[75] Inventor: John H. Parks, Peoria, Ill.

[73] Assignee: Caterpillar Tractor Co., Peoria, Ill.

[22] Filed: Feb. 11, 1976

[21] Appl. No.: 657,127

[52] U.S. Cl. .................................................. 74/569
[51] Int. Cl.² ........................................ F16H 53/06
[58] Field of Search .......................... 74/569, 567

[56] References Cited
UNITED STATES PATENTS

| 2,947,196 | 8/1960 | Van Dorn et al. | 74/569 |
| 3,831,457 | 8/1974 | Kern | 74/569 |

*Primary Examiner*—Allan D. Herrmann
*Attorney, Agent, or Firm*—Phillips, Moore, Weissenberger, Lempio & Majestic

[57] ABSTRACT

A cam follower in the form of a roller has a annular groove of arcuate cross-section in its opposite sides in order to minimize contact stress.

4 Claims, 6 Drawing Figures

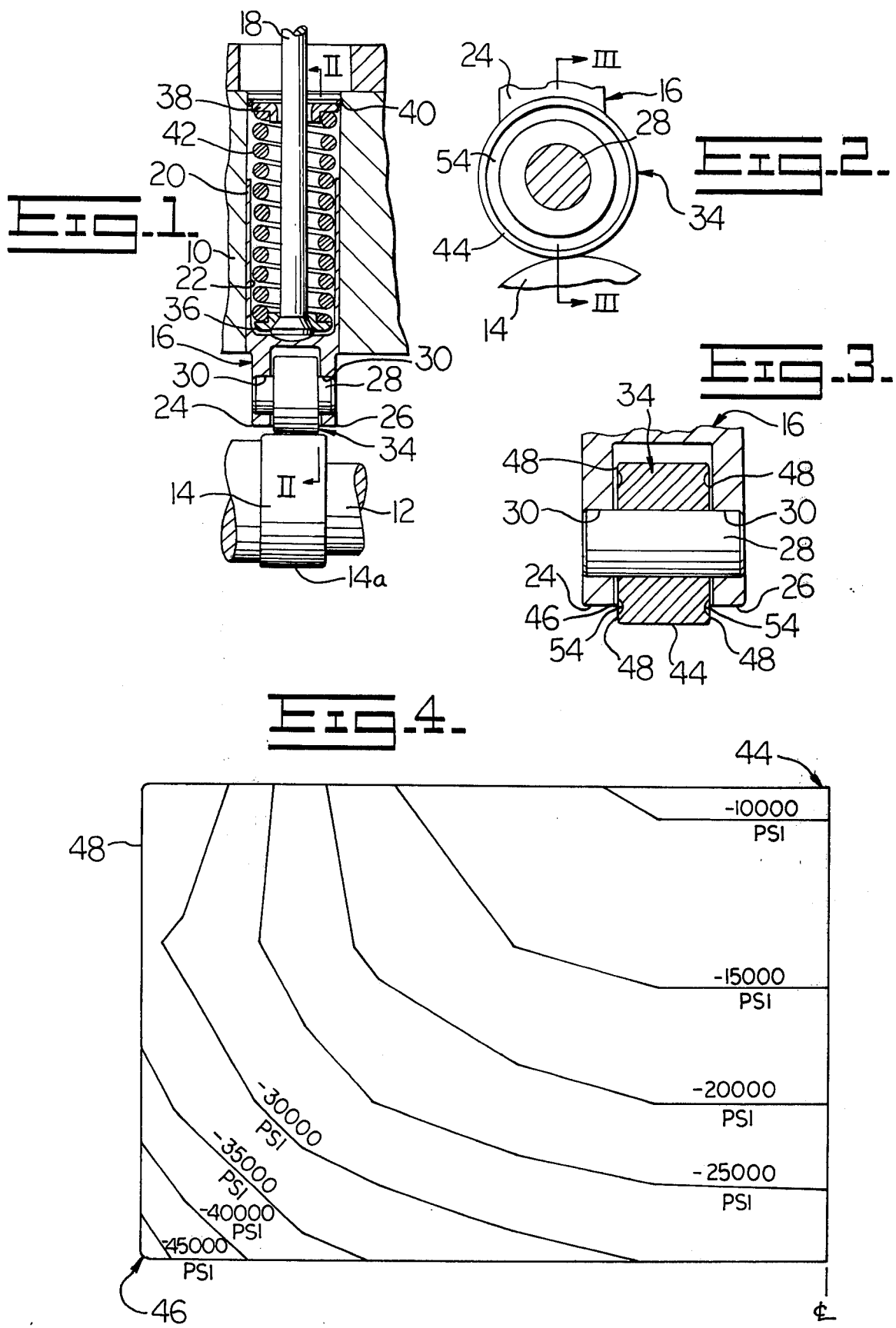

LOW STRESS CAM ROLLER

BACKGROUND OF THE INVENTION

This invention relates to a cam follower in the form of a roller for use in cam and follower mechanisms for operating valves, fuel injection devices, and similar elements such as found in internal combustion engines. In particular, this invention relates to a means in the form of annular grooves of arcuate cross-section located in opposite sides of a roller in order to minimize contact stress.

In prior art cam and follower mechanisms contact stresses are set up along the point of contact between the roller and cam surface. These contact stresses are typically variable and range from a minimum at the roller center to a maximum at the roller edge. The substantial edge loading thus produced, after extended operation, causes wear on the cams and rollers. This is especially true where diesel engines are concerned as when used to operate fuel injectors. Observations made on the worn cam shaft show that in most instances cam wear initiates at the outer edge of the follower roller. Wear then progresses from the point of initiation across the lobe of the cam until the full width of the roller path engagement on the cam surface is encompassed.

In order to mitigate or eliminate such wear, various approaches have been used. One approach is that shown in U.S. Pat. No. 3,831,457 to Kearn. In that construction the outer peripheral contact surface of the cam roller is of varying width to effect a variable roller edge contact on the surface of the cam. However, while the edge loading is caused to variably track across the cam, maximum stresses still occur in the roller edges.

SUMMARY AND OJBECTS OF THE INVENTION

It is therefore the primary object of this invention to provide a follower roller which produces minimum contact stress.

It is a further object of this invention to provide such a follower roller having semicircular annular grooves on its opposite sides in order to minimize contact stress.

It is a further object of this invention to provide a cam follower roller of a configuration to minimize contact stress.

These and other objects of the invention are attained in the cam roller follower mechanism by means of the inclusion of a pair of annular grooves of arcuate cross-section in opposite faces of the roller. In this manner, stresses in the roller are relieved and contact stresses are minimized.

It is to be understood that other objects and advantages of the invention will become more readily apparent by having reference to the following description which is to be read in connection with the accompanying drawings.

BRIEF DESCRIPTION OF THE DRAWINGS

FIG. 1 is an elevational sectional view of a portion of an internal combustion engine having a cam and follower roller mechanism in accordance with the instant invention;

FIG. 2 is an end view of the follower roller of FIG. 1 taken along line II—II of FIG. 1;

FIG. 3 is a sectional view of the follower roller of FIG. 1 taken along line III—III of FIG. 2;

FIG. 4 is an enlarged view of a prior art follower roller half showing the lines of stress which may be expected therein;

DETAILED DESCRIPTION

Figure 5:
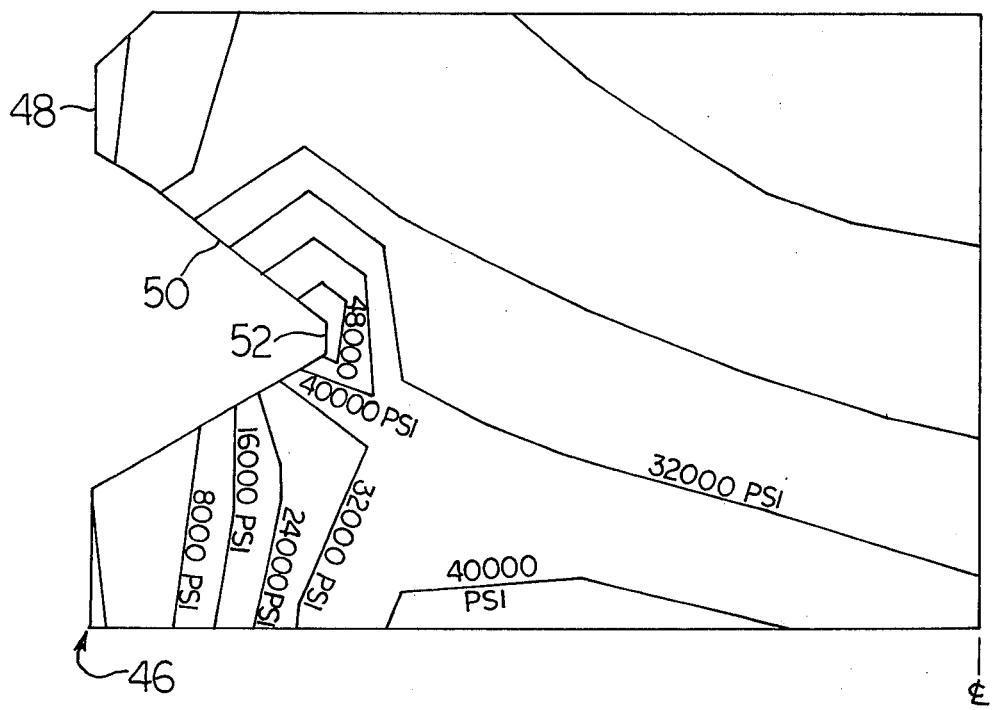
FIG. 5 is an enlarged view similar to FIG. 4 showing the effect of a V-shaped annular groove located in the sidewalls of the roller on the stress lines.

Referring to FIG. 1, there is shown generally at 10 a cylinder head of an internal combustion engine, as for example a diesel engine. The engine has a cam shaft 12 suitably journalled therein in a conventional manner. Located on cam shaft 12 is a cam 14 having a straight follower lifting cam surface 14a which is used to effect reciprocal movement of a valve, fuel injection device, or similar element associated with the engine through a roller follower mechanism 16. The roller follower mechanism 16 includes a push rod 18, the lower end of which abuts and sockets into the end wall of a cup-shaped follower member 20 which is slidably received in the bore 22 in the cylinder head 10.

The lower end of the cup-shaped follower member 20 terminates in a pair of spaced apart depending arms 24, 26 which in turn support the opposite ends of a roller shaft 28 in bores 30, 32 provided for this purpose in the arms. A cam follower roller 34, which will be hereinafter described, is rotatably journalled on the shaft 28 and is guided in an axial direction by the inner faces of the arms 24, 26.

Follower roller 34 is continuously biased into rolling contact with the cam surface 14a of arm 14 by means of a spring 42 which is positioned in the bore 22 of cylinder block 10 to encircle push rod 18. One end of the spring abuts against a lower spring seat 36 engaging the lower socket end of the push rod 18 and the other end of the spring abuts against its upper spring seat 38 retained axially in one direction within the bore 22 by means of a spring retainer ring 40 positioned within a suitable annular groove formed in the cylinder head.

Referring now to FIG. 4, there is shown a plot of the lines of stress caused by contact loading in a prior art follower roller. It is to be understood that the stress plot shown is of the left half of the roller for purposes of convenience and that the right half (not shown) is a mirror image of the left half. As may be seen, the stress is a minimum at the center contact surface portion 44 of the roller and increases to a maximum at the radially intermost corner 46 of the outside wall 48. As indicated, a substantial edge loading occurs at edge 46.

Turning to FIG. 5, there is shown the effect of the addition in the sidewall 48 of a V-shaped annular groove 50. As shown, contact stresses are relieved at the radially innermost corner 46. However, exceptionally high stresses are encountered in the notch region of the groove 52. Thus, the effect of a V-shaped groove is actually worse than that encountered with the prior art roller having no groove as shown in FIG. 4.

Figure 6:
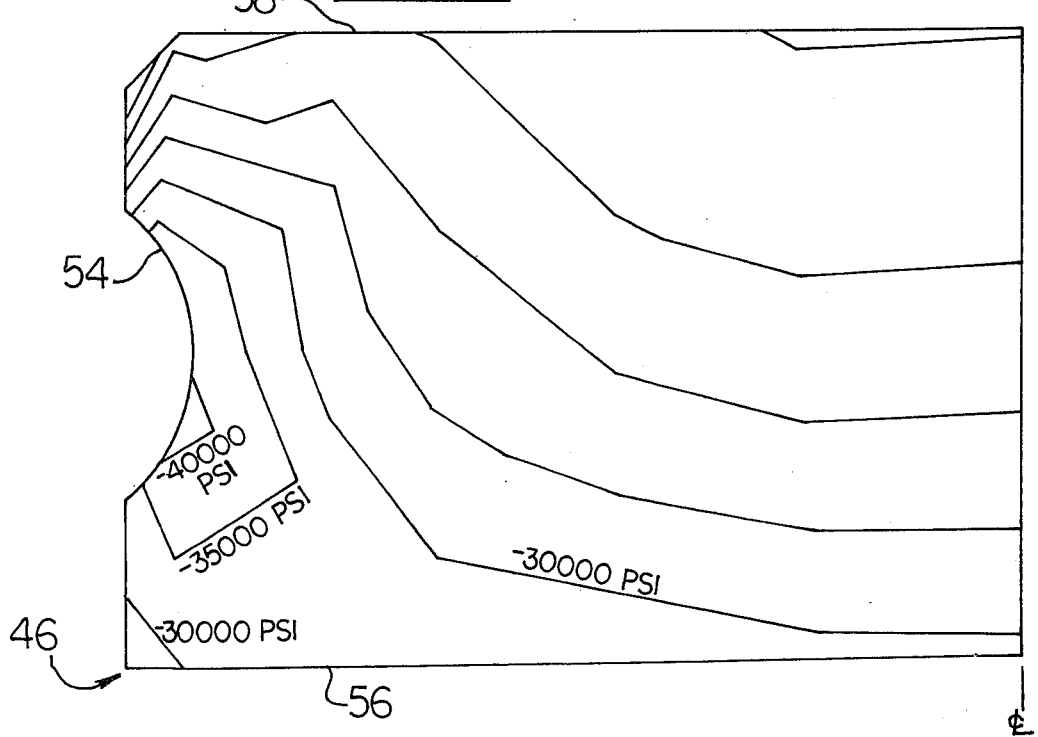
FIG. 6 is a sectional view similar to FIGS. 4 and 5 showing the effect on the stress distribution of the annular groove of arcuate cross-section in the follower roller sidewalls.

It has been found, however, that an annular groove of arcuate cross-section 54, as shown in FIG. 6, does produce the desired minimizing of the contact stress. As shown, the stress at edge 46 is reduced, but at the same time the stress within the semicircular groove is not increased substantially. The groove is shown centered equidistant between the radially innermost and radially outermost surfaces of the rollers 56, 58, respectively. However, the placement and contour of the groove depends upon the particular application and is influenced by factors such as roller width, and length, amount of loading, etc.

It is to be understood that the foregoing description is merely illustrative of a preferred embodiment of the invention, and that the scope of the invention is not to be limited thereto but is to be determined by the scope of the appended claims.

What is claimed is:

1. In a cam follower mechanism, a rotary cam having a straight follower lifting cam surface, a reciprocally guided follower, a follower roller rotatably supported by said follower for engagement with same cam surface, said roller being a generally cylindrical member having a peripheral contact surface and a pair of opposite, radially directed sidewalls, wherein the improvement comprises means on said roller for relieving stress, said means on said roller comprising an annular groove in each of said radially directed sidewalls, said annular groove being arcuate in cross-section.

2. The invention of claim 1 wherein said roller defines a longitudinal axis, an axially directed bore through said roller, said sidewalls being defined by said bore and said contact surface.

3. The invention of claim 2 further including a shaft extending through said bore through said roller, and wherein said roller is rotatably journaled on said shaft.

4. The invention of claim 3 wherein said annular grooves are entirely curved and free from straight portions and arcuate throughout the entire cross-section thereof, and wherein said annular grooves are centered intermediate said bore and said contact surface so as to be equidistant therebetween.

* * * * *